United States Patent Office 3,846,311
Patented Nov. 5, 1974

3,846,311
METHOD FOR REMOVING ELEMENTAL SULFUR FROM WELLS AND FLOWLINES
Shelby P. Sharp and Lamar F. Sudduth, Tulsa, Okla., assignors to Amoco Production Company, Tulsa, Okla.
No Drawing. Continuation-in-part of abandoned application Ser. No. 178,435, Sept. 7, 1971. This application Mar. 26, 1973, Ser. No. 345,051
Int. Cl. C23g 5/02; E21b 43/00
U.S. Cl. 252—8.55 B                    9 Claims

ABSTRACT OF THE DISCLOSURE

An improved solvent for sulfur is prepared by aging a mixture of liquid dialkyl disulfide(s) and a small but effective amount of an unsubstituted aliphatic amine. The aging process markedly improves the solvent power of the mixture and may be accomplished either by allowing such mixture to stand at room temperature for a period up to several months or it may be held at an elevated temperature such as, for example, 100° F. for a period of 10–25 days.

---

This application is a continuation-in-part of our copending case U.S. Ser. No. 178,435, filed Sept. 7, 1971, now abandoned.

This invention relates to a novel procedure and compositions useful in removing solid sulfur deposited in oil well bores, flowlines, etc., and the beneficial effect on the equipment resulting from the use thereof. More particularly, it is concerned with a novel method for the preparation of compositions having extraordinary ability to dissolve several times their weight of elemental sulfur and to said compositions per se.

BACKGROUND OF THE INVENTION

The problem of sulfur accumulating in sour gas and distillate wells to plug the flow of fluids therein has plagued the industry for some time—see *Oil and Gas Journal*, Apr. 17, 1967, page 113, and Apr. 1, 1968, page 80. In the past it has been the practice to remove sulfur collecting in sour gas wells and flowlines associated therewith by the use of such solvents as carbon disulfide, alkyl sulfides, dialkyl disulfides and solutions of ammonium polysulfide-forming compounds (U.S. 3,501,397). These materials, however, have a number of disadvantages. First of all, carbon disulfide, which has the best solvent power for sulfur of the commonly known solvents, is expensive. For example, treatment of a typical sour gas well to remove accumulated sulfur therefrom costs about $150 for 3 barrels of carbon disulfide (440 lbs./bbl.). A further complication resulting from the use of carbon disulfide as a sulfur solvent is encountered where the alkylol amines or Sulfinol solutions are employed in the gas sweetening process to remove hydrogen sulfide from the well stream. The carbon disulfide from the well and/or flowline treatment is produced along with the reservoir fluids and enters the gas sweetening unit and the carbon disulfide tends to react with the alkylol amine present, converting the latter to its corresponding oxyzalidone, thiourea and other degradation products which are not regenerable. For example, the Sulfinol solution used for gas sweetening typically contains 40 percent diisopropanol amine, 45 percent sulfolane and 15 percent water. Carbon disulfide reacts with the diisopropanol amine-forming compounds of the above-mentioned type from which it—the diisopropanol amine—cannot be regenerated. In a 1500 LT/D sulfur plant where the Sulfinol process is used to remove hydrogen sulfide and carbon dioxide from the gas, the estimated cost of the diisopropanol amine makeup in the plant due to loss by reaction with carbon disulfide is about $150,000 per year.

While the alkyl sulfides and dialkyl disulfides are not subject to the same drawbacks as carbon disulfide as solvents for sulfur removal in sour gas wells, these materials exhibit substantially less solvent power for free sulfur than carbon disulfide.

DESCRIPTION OF THE INVENTION

We have now discovered that the solvent power of the liquid dialkyl disulfide(s)-amine mixtures for elemental sulfur disclosed in our aforesaid copending application can be materially increased by subjecting such mixtures to an aging process prior to their use in dissolving deposited sulfur which is either in powdered or chunk form. The amine is generally employed in a small but effective amount, preferably not more than about 10 weight percent based on the weight of the dialkyl disulfide. Higher concentrations of amine may be used. However, we have observed little or no advantage in employing amounts greater than 10 weight percent.

In addition to the marked increase in solvent power over the alkyl sulfides and dialkyl disulfides of the prior art, the catalyzed solvent systems of our invention do not tend to react with any of the components of the sweetening system, thus avoiding costly replacement of the materials such as alkylol amines employed as one of such components. They have the added advantage of not being very volatile, thus aiding in retaining them in the system, thereby reducing the amount required to accomplish the desired result.

In carrying out the process of our invention the dialkyl disulfide containing an effective amount of amine catalyst or solvent activator is introduced into the well from which deposits of free sulfur are to be removed. Deposited sulfur as well as free sulfur present in the sour gas dissolves in the solvent on contact therewith. The injected solvent containing dissolved sulfur being a relatively small portion of the well production is allowed to remain in the produced well fluids. To demonstrate the effectiveness of the solvent systems of our invention, attention is called to the fact that the solubility of sulfur in n-butyl sulfide at 150° F. is 14 lbs./bbl. (293 lbs.) in a well producing a gas containing 2000 lbs. of sulfur per M m.c.f. Four thousand two hundred eighty barrels of butyl sulfide would be required to handle the sulfur in a well producing 30 m.c.f./day of such sour gas. On the other hand, only 306 barrels of the dialkyl disulfide solvent referred to herein and catalyzed with aliphatic amine is required to remove the same amount of sulfur per day from the system. At 150° F., the solubility of elemental sulfur in the dialkyl disulfide stream catalyzed with aliphatic amine is fourteen times that of n-butyl sulfide.

As examples of the liquid dialkyl disulfides which can be catalyzed by the addition of aliphatic amines there may be mentioned dimethyl disulfide, diethyl disulfide, dioctyl disulfide, ditertiary tetradecyl disulfide, and the like. As the disulfide component of our improved sulfur solvent we ordinarily prefer to employ a mixture of aliphatic disulfides in which each aliphatic group therein contains from about two to eleven carbon atoms, e.g., $(C_2H_5S)_2$, $(C_{11}H_{23}S)_2$, etc., typically those disulfide mixtures produced as a product stream of the Merox process described in the *Oil and Gas Journal*, Vol. 57, pages, 73–78, Oct. 26, 1959. Briefly, such mixtures of disulfides are produced by first contacting a refinery hydrocarbon stream containing aliphatic mercaptans with a caustic solution to produce the corresponding sodium salt of the mercaptans. The latter are then converted to dialkyl disulfides by air oxidation, simultaneously regenerating the caustic.

Typical of the aliphatic amines useful as catalysts to increase the solvent power of the dialkyl disulfides for sulfur are the normally liquid amines such as diethylamine, diisopropylamine, 2-ethylhexylamine, butylamine, hexylamine, octylamine, dodecylamine, and the like.

DESCRIPTION OF SPECIFIC EMBODIMENT

The action of amines to increase the solvent power of dialkyl disulfides for sulfur although quite selective is very good even without an aging treatment. With respect to the ability of such amines to improve the solvent power of the liquid dialkyl disulfides, it has been our observation that only the aliphatic unsubstituted amines exhibit this property. Such selectivity is demonstrated in Table I below, where 100 grams of Merox solvent was added to 260 grams of elemental sulfur. To this, with the exception of the first test which was a control, the designated amine was added in the amount shown. The different mixtures were then heated, in the presence of agitation, to a temperature of about 200° F., after which the clear liquid was decanted off and the wet residue weighed to determine by difference the amount of sulfur dissolved.

TABLE I

| Amine | Amount added, grams | Solubility of sulfur in amine catalyzed Merox solvent, grams sulfur/100 grams solvent |
|---|---|---|
| Control | 0 | 4.3 |
| Di-n-propylamine | 5.1 | 229.0 |
| Triethylamine | 5.1 | 208.0 |
| 2-ethylhexylamine | 5.1 | 229.0 |
| Hexylamine | 5.3 | 259.0 |
| Octylamine | 5.6 | 253.0 |
| Diphenylamine | 5.1 | 2.97 |
| Diisopropanolamine | 6.9 | 7.4 |
| Pyridine | 6.9 | 8.0 |
| Diethylamine [1] | 5.0 | 0 |

[1] Used dimethyl sulfide (B.P., 100° F.) as sulfur solvent.

From the data appearing in Table I immediately above and elsewhere in this description, it is evident that the aliphatic unsubstituted amines possess a unique ability to increase the solvent power of aliphatic disulfides for free sulfur.

Although we have found the solubility of free sulfur in the solvent systems of our invention to vary somewhat with the sulfur source, a side-by-side comparison of said systems with the alkyl sulfides or dialkyl disulfides as described in U.S. 3,531,160 shows the former to exhibit far greater solvent power for sulfur. These systems not only serve to dissolve sulfur from well tubing and flowlines at least as well as carbon disulfide, but do not have the disadvantage of carbon disulfide which undergoes irreversible reactions with the alkylolamines present in sweetening units, thus adding substantially to the operating costs thereof. With respect to the above comment that the solubility of sulfur in dialkyl disulfide-amine mixtures varies somewhat with the sulfur source, it is to be pointed out that the powdered or highly pulverized form of elemental sulfur is more soluble than the massive or chunk sulfur. This is demonstrated by the fact that in Table I of our aforesaid copending application U.S. Ser. No. 178,435, 100 grams of a liquid mixture of dialkyl disulfides containing 4 grams of a mixture of diethylamine and hexylamine dissolve 350 grams of powdered sulfur at temperatures of 160° and 200° F. whereas at comparable temperatures sulfur in chunks of about .5 inch in diameter in some cases dissolved less than 250 grams of sulfur.

We have further found that the solvent power of these dialkyl disulfides containing an effective amount, e.g., not in excess of from about 5–10 weight percent based on the weight of the disulfide, of an unsubstituted aliphatic amine can be increased from about 75% to more than 100% by either aging the mixture of amine and disulfide or heating it for a period of time prior to using it as a solvent for solid sulfur. For example, up to about 10% of the amine may be incorporated into the liquid dialkyl disulfide and the resulting mixture allowed to stand at a temperature of 75° F. (room temperature) to about 100° F. for 10-25 days. With the lower temperature in the aforesaid range it may be desirable to age the mixture for a period as much as 30–90 days. Additional aging insofar as we are aware has no deleterious effect on the solvent power of such solutions and may in some instances improve their ability to dissolve sulfur. However, in most cases, longer aging periods may be impractical. In this connection the terms "aged" or "aging" as used in the appended claims are to be interpreted to refer only to liquid dialkyl disulfide-amine systems that have either been aged for an extended period of time, e.g., 20–90 days at room temperature, or shorter aging periods at temperatures up to about 100° F.

The solvent power of these aged mixtures was compared to that of carbon disulfide at room temperature. It was found, for example, that 31.5 grams of carbon disulfide dissolves 15 grams of ground (20–30 mesh) sulfur in about 14 minutes at 76° F. although as the system approaches saturation the rate of solution slows down appreciably. The same weight of a mixture of dialkyl disulfides produced in accordance with the procedure disclosed in U.S. 2,549,052 and aged with about 7 grams of diethylamine for about 4 months at 76° F. dissolves sulfur more slowly than carbon disulfide, requiring about 1 hour to dissolve 15 grams of sulfur of the same particle size. However, the dialkyl disulfide-amine solution continued to dissolve sulfur and an additional 15 grams was taken into solution in the next 80 minutes. The rate at which the aforesaid dialkyl disulfide-amine solution dissolved sulfur increases with time, initially undergoing an "induction" period during which the sulfur dissolves slowly; thereafter the solution rate accelerates. Apparently this induction period represents the time required for the disulfide to become activated and begin to form polysulfides at an appreciable rate. It is believed that this chemical reaction to form polysulfides gives the disulfide oils their greater capacity to dissolve sulfur. The data shown in the example below indicate that this induction period is substantially shortened by heating.

EXAMPLE I

One hundred grams of mixed dialkyl disulfides (prepared in accordance with the procedure disclosed in U.S. 2,549,052) having a carbon content ranging from about 4 to 26 carbon atoms and containing 10% diethylamine based on the weight of the disulfides was heated in a closed vessel to a temperature of 100° F. and held at that level for 10 days. During the first day of heating the mixture generated a pressure of 40 mm. Hg. Thereafter the pressure was observed to decrease until after the tenth day the system reached a pressure of 67 mm. Hg below atmospheric pressure. An additional 5 days of heating made no appreciable change in the pressure. The solubility of sulfur in solvent mixtures aged 10 and 15 days (at 100° F.), respectively, is illustrated in the following table and compared to the unaged solvent.

TABLE

| Weight disulfide oil, grams | Weight of diethylamine added, grams | No. of days aged | Weight of elemental sulfur added, grams | Solution temp., ° F. | Weight of sulfur dissolved in disulfide-amine solution |
|---|---|---|---|---|---|
| 100 | 7.1 | 10 | 450.0 | 200 | 450.0 |
| 100 | 7.0 | 15 | 575.2 | 200 | 564.2 |
| 100 | 4.0 | 0 | 250.0 | 150 | 246.2 |
| 100 | 7.1 | 10 | 557.5 | 200 | 552.7 |
| 100 | 7.1 | 0 | 260.0 | 200 | 258.0 |

These tests indicate that most of the diethylamine chemically reacts with the disulfide oil at 100° F. within 2 or 3 days. The loss of diethylamine from the vessel holding the solvent should not be very great. The reaction product was found to have a much higher capacity for dissolving sulfur (564.2 grams at 200° F.) than any other solvent system we have investigated. Thus it appears that the sulfur solubility is enhanced considerably by allowing the amine to react chemically with the liquid dialkyl disulfide. While this reaction occurs also at about 75° F., it is of course more rapid at higher temperatures.

The following example illustrates the ability of disulfide-amine solutions aged at ambient temperatures to dissolve elemental sulfur.

EXAMPLE II

Three 100-gram portions of the disulfide oil of the type used in Example I were each mixed with 10 ml. of diethylamine and stored at room temperature for varying times prior to testing. In testing the solubility of sulfur in these various aged systems, the following results were obtained.

TABLE

| Weight disulfide oil, grams | Weight of diethylamine added, grams | Aging period, days | Weight of elemental sulfur added, grams | Solution temp., °F. | Weight of sulfur dissolved in disulfide amine solution |
|---|---|---|---|---|---|
| 100.0 | 7.1 | 20 | 260.0 | 200.0 | 252.8 |
| 100.0 | 7.1 | 58 | 260.0 | *110.0 | 260.0 |
| 100.0 | 7.1 | 93 | 360.0 | 200.0 | 353.0 |

*All sulfur went into solution at 110° F.

These tests demonstrate that the ability of the disulfide oil to dissolve free sulfur is enhanced considerably by mixing the amine catalyst with disulfide and allowing the mixture to set for about two months before use as a sulfur solvent.

Based on experimental results, it is our belief that the elemental sulfur is dissolved by the amine-dialkyl disulfide mixture through a polymerization reaction in which free sulfur is taken up by the disulfide having the structure

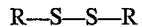

wherein R is an alkyl group, and reacts to form a liquid dialkyl polysulfide having the general structural formula

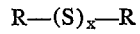

in which x represents a whole number. These polymers are generally clear liquids, ranging in color initially from light brown to dark brown and eventually to a dark red near the conclusion of the polymerization.

While the foregoing examples have been limited largely to the use of a mixture of dialkyl disulfides and diethylamine, it is to be understood that other liquid dialkyl disulfides with any of the above-mentioned unsubstituted aliphatic amines are improved with respect to their solvent power for sulfur by aging such mixtures in accordance with our invention.

We claim:
1. A method for improving the solvent power of a liquid dialkyl disulfide for elemental sulfur which comprises reacting a normally liquid saturated unsubstituted aliphatic amine with said disulfide, said amine being employed in an amount not in excess of about 10 weight percent based on the weight of said disulfide, said reaction being effected in the substantial absence of free sulfur under one of the following conditions:
   (1) permitting the amine-disulfide mixture to stand at a temperature of about 75° F. for a period of from about 30 to about 90 days,
   (2) subjecting said mixture to a temperature of from 75° to about 100° F. for a period of from about 10 to about 25 days.
2. The method of Claim 1 wherein the liquid disulfide component is a mixture of disulfides having from 4 to 22 carbon atoms.
3. The method of Claim 1 wherein the amine employed is diethylamine.
4. The method of Claim 1, wherein the amine employed contains from 4 to 12 carbon atoms.
5. A method for the removal of deposited elemental sulfur from a conduit which comprises introducing into said conduit a solvent mixture prepared in accordance with the method of Claim 1, allowing said deposit to dissolve in said solvent, and thereafter withdrawing the resulting mixture from said conduit.
6. The method of Claim 5 wherein said conduit is the bore of a sour gas sulfur well.
7. The method of Claim 6 wherein the amine employed contains from 4 to 12 carbon atoms.
8. The method of Claim 5 wherein the liquid dialkyl disulfide component is a mixture of disulfides having from 4 to 22 carbon atoms.
9. The method of Claim 5 wherein the amine employed is diethyl amine.

References Cited
UNITED STATES PATENTS

| 3,531,160 | 9/1970 | Fisher | 166—312 X |
| 2,237,627 | 4/1941 | Olin | 260—125 |
| 2,852,436 | 9/1968 | Spindt et al. | 208—236 |
| 2,279,277 | 4/1942 | Shoemaker | 208—236 X |
| 2,549,052 | 4/1951 | Brown et al. | 208—233 |
| 3,314,999 | 4/1967 | Bapseres et al. | 260—608 |

HERBERT B. GUYNN, Primary Examiner

U.S. Cl. X.R.

166—312; 252—364; 299—4, 5